(12) United States Patent
Hirakawa

(10) Patent No.: US 6,879,730 B1
(45) Date of Patent: Apr. 12, 2005

(54) SENSITIVITY CORRECTION METHOD AND IMAGE READING DEVICE

(75) Inventor: Takashi Hirakawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/547,869

(22) Filed: Apr. 12, 2000

(30) Foreign Application Priority Data

Apr. 12, 1999 (JP) .......................................... 11-104117

(51) Int. Cl.[7] ................................................ G06K 9/40
(52) U.S. Cl. ...................... 382/274; 358/461; 358/518; 382/167; 382/312
(58) Field of Search ................................ 358/443, 448, 358/461, 474, 515–520; 382/162, 167, 274, 275, 312

(56) References Cited

U.S. PATENT DOCUMENTS

| 5,189,528 | A | * | 2/1993 | Takashima et al. .......... 358/448 |
| 5,206,501 | A | * | 4/1993 | Sakakibara .............. 250/208.1 |
| 5,210,600 | A | * | 5/1993 | Hirata ........................ 358/527 |
| 5,237,401 | A | * | 8/1993 | Koike et al. ................ 358/518 |
| 5,408,092 | A | * | 4/1995 | Maurice et al. ......... 250/227.21 |
| 5,442,464 | A | * | 8/1995 | Ito ............................. 358/482 |
| 5,510,908 | A | * | 4/1996 | Watanabe et al. ........... 358/448 |
| 5,796,496 | A | * | 8/1998 | Ono ........................... 358/498 |
| 6,028,957 | A | * | 2/2000 | Katori et al. ................ 382/162 |
| 6,091,445 | A | * | 7/2000 | Matsui et al. ................ 348/96 |
| 6,175,660 | B1 | * | 1/2001 | Nabeshima et al. ........ 382/274 |
| 6,195,469 | B1 | * | 2/2001 | Nishioka et al. ............. 382/274 |
| 6,201,616 | B1 | * | 3/2001 | Sasanuma et al. .......... 358/450 |
| 6,225,934 | B1 | * | 5/2001 | Ohashi et al. ............... 341/155 |
| 6,256,473 | B1 | * | 7/2001 | Kamanuma et al. ........ 399/367 |
| 6,271,938 | B1 | * | 8/2001 | Hikita ........................ 358/443 |
| 6,278,474 | B1 | * | 8/2001 | Wada et al. ................. 347/241 |
| 6,330,083 | B1 | * | 12/2001 | Nabeshima et al. ........ 358/474 |
| 6,526,185 | B1 | * | 2/2003 | Murakami ................... 382/312 |
| 6,587,224 | B1 | * | 7/2003 | Nabeshima et al. ......... 358/1.9 |

* cited by examiner

Primary Examiner—Bhavesh M. Mehta
Assistant Examiner—Gregory Desire
(74) Attorney, Agent, or Firm—Sughrue Mion, PLLC

(57) ABSTRACT

There is provided a sensitivity correction method in which shading can be eliminated regardless of a type of a photographic film. A film carrier is moved to a position where a vertical direction center of a first correction plate, having a uniform spectral reflection characteristic, is coincident with an optical axis. Transmitted light from the first correction plate is detected by a linear CCD, and shading data for a positive is acquired. The film carrier is moved to a position where a vertical direction center of a second correction plate, having a spectral reflection characteristic substantially identical to that of a base portion of a negative film, is coincident with the optical axis. Transmitted light from the second correction plate is detected by the linear CCD, and shading data for a negative is obtained. At the time of reading a film image, sensitivity correction is carried out on output data of the linear CCD on the basis of the shading data for the positive in a case in which a photographic film which is an object of reading is a positive film, and on the basis of the shading data for the negative in a case in which the photographic film is a negative film.

15 Claims, 9 Drawing Sheets

F I G. 1
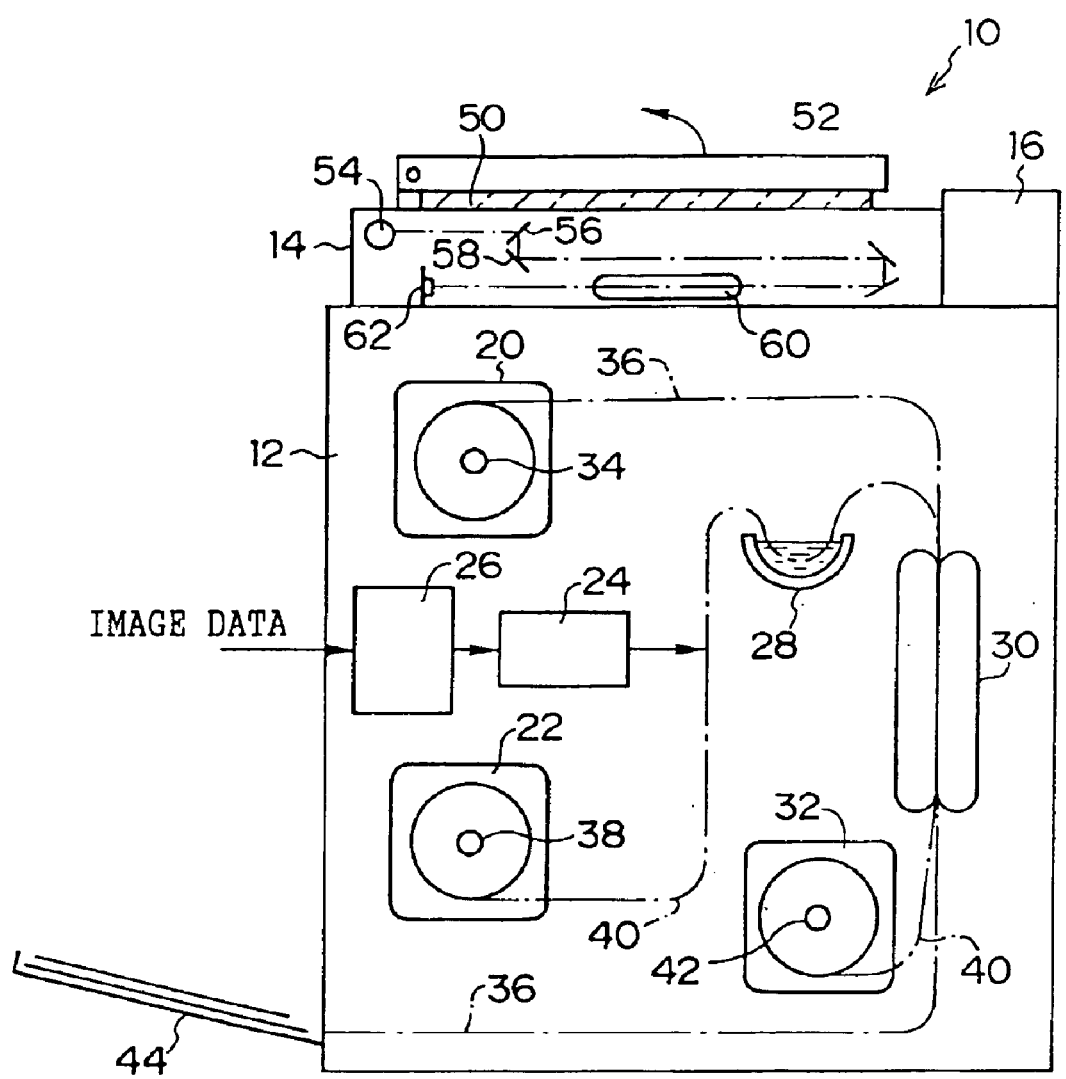

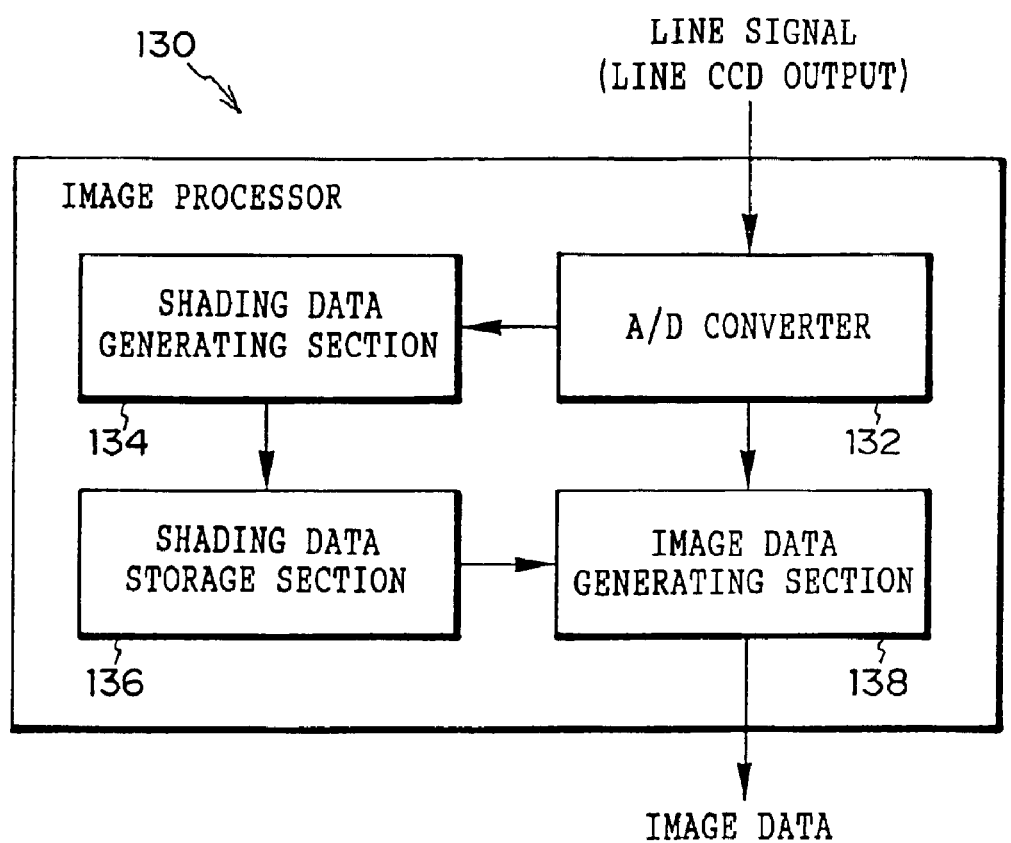
F I G. 3

F I G. 5
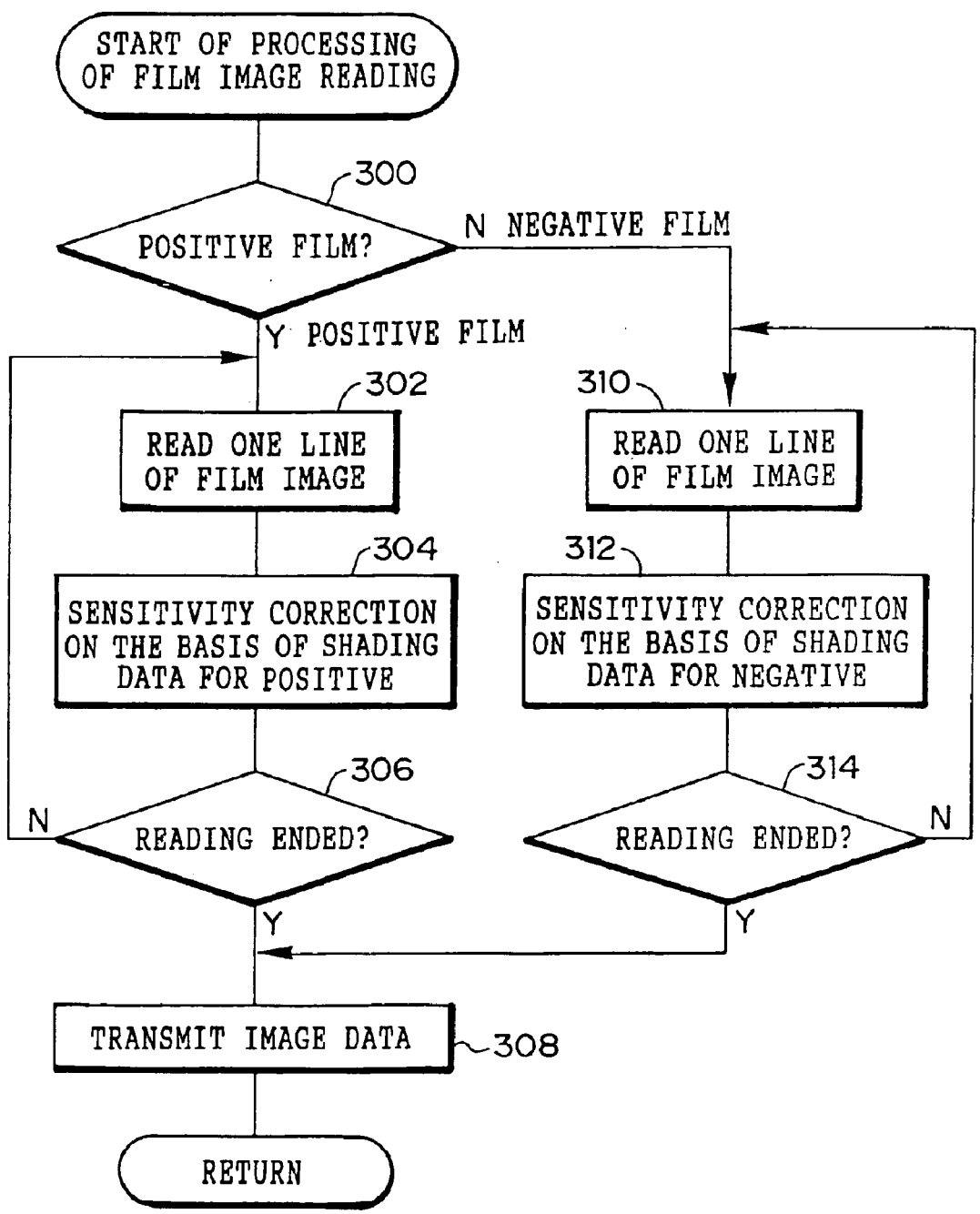

F I G. 7A
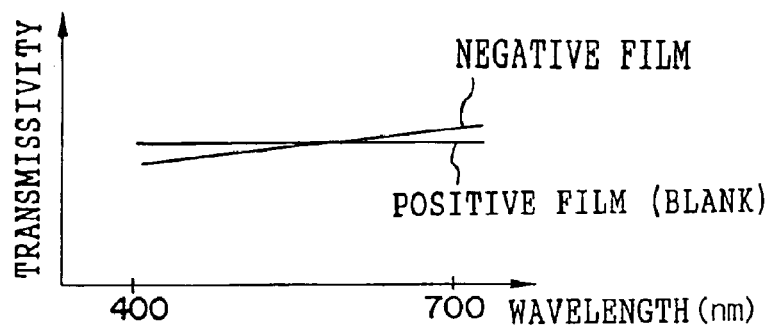
F I G. 7B
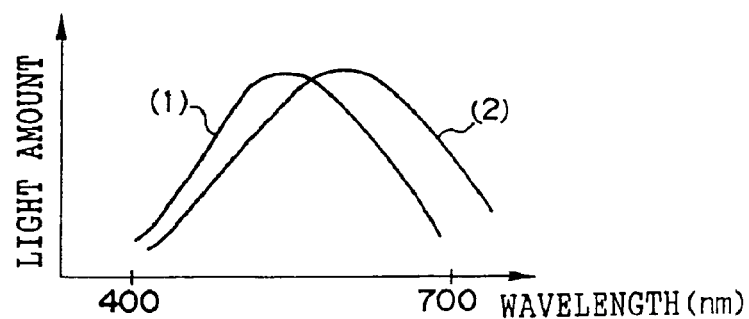
F I G. 7C
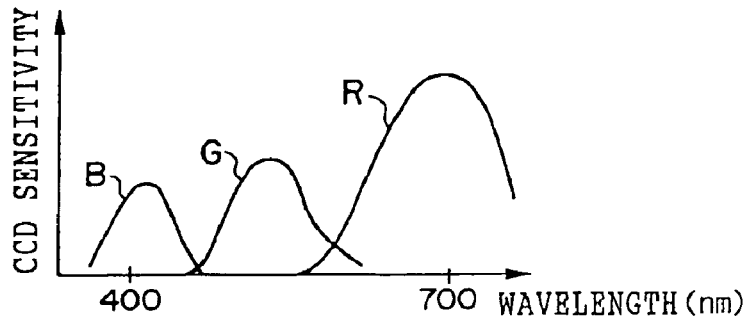
F I G. 7D
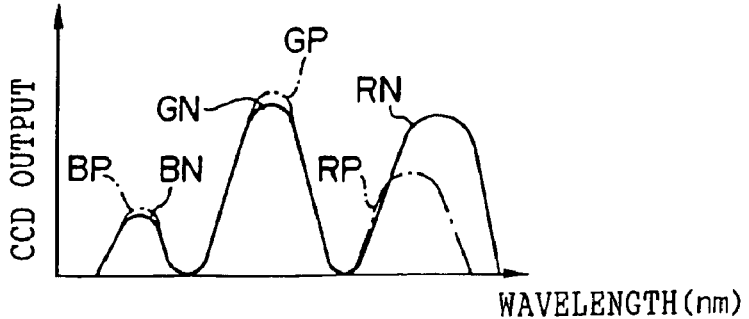

F I G. 9
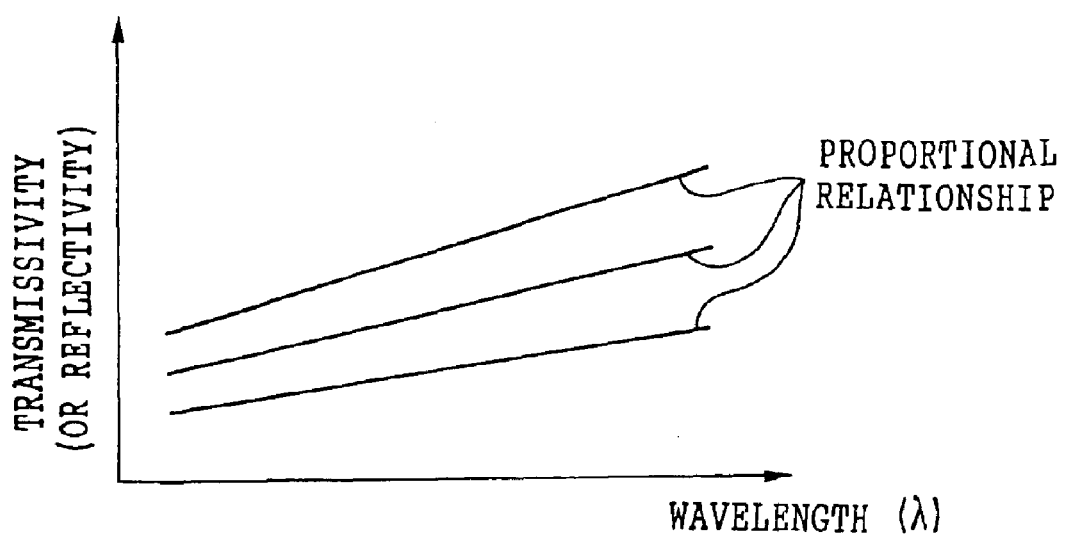

SENSITIVITY CORRECTION METHOD AND IMAGE READING DEVICE

BACKGROUND OF THE INVENTION

1. Field of the Invention

The present invention relates to a sensitivity correction method and an image reading device, and in particular to a sensitivity correction method and an image reading device for eliminating the influence of shading from a read image when an original is irradiated with light, the light transmitted therethrough or reflected thereby is detected by photoelectric conversion elements, and an image recorded on the original is read.

2. Description of the Related Art

In recent years, an image reading device has been put to practical use which, while a photographic film is conveyed in a sub-scan direction at a constant reading speed, reads a film image recorded on the photographic film by a three-linear CCD (Charge Coupled Device) which converts an amount of received light at each channel corresponding to the respective each colors of RGB into color signals, performs processings such as various corrections on image data obtained by this reading, and then, carries out image recording onto a recording material such as photographic printing paper, or carries out image display on a display, or the like. Such an image reading device has the merit that, as compared with a conventional image reading device in which a film image is recorded on photographic printing paper by surface exposure, it is easy to automate the operations from reading of an image recorded on a photographic film to recording of an image onto a recording material such as photographic printing paper.

Here, in the image reading device described above, the photographic film is irradiated with light and transmitted light is detected so that the film image is read (so-called transmission type image reading device), or light reflected from the photographic film is detected so that the film image is read (so-called reflection type image reading device). At this time, in the linear CCD, wavelength characteristics of light detection sensitivity of the CCD fluctuate for each pixel (see FIG. 8A), and it is difficult to uniformly irradiate the photographic film with light from a light source and thus amount of irradiation light is irregular (see FIG. 8B). Shading is thereby caused on a read image (see FIG. 8C). In the image reading device, sensitivity correction is carried out for each pixel to prevent an influence of the shading from being exhibited in the read image.

Specifically, for example, before the start of image reading, in the transmission type image forming apparatus, a state (blank state) where a photographic film is not set is read by a CCD, shading caused by differences in light sources and differences in sensitivities of each pixel of the CCD is detected, and a correction amount is obtained in advance for each pixel so that the results of reading (CCD output) become uniform and the respective RGB colors are balanced with each other. At the time of reading the film image, this correction amount is used and correction is carried out on the CCD output obtained at the time of reading the film image, so that the influence of the shading is eliminated from the read image. In the reflection type image forming apparatus, a white reference plate is set instead of a photographic film, and a correction amount is obtained from the results of reading (CCD output).

It is known that the spectral characteristic (spectral transmission characteristic/spectral reflection characteristic) of a photographic film differs in accordance with the type of the film, such as negative, positive, DCN, black-and-white, sepia, or the like. For example, in the case of a positive film, the transmissivity (or reflectivity) is substantially constant regardless of the wavelength of light (wavelengths in the visible region), whereas in the case of a negative film, because the base portion is colored, the transmissivity (or reflectivity) is dependent upon wavelength.

Thus, in the case where an image recorded on a negative film is read, the light amount balance at the time of reading deviate from the light amount balance at the time when the correction amount is obtained. Thus, a satisfactory shading eliminating effect cannot be obtained by the sensitivity correction of conventional techniques, and a high quality read image cannot be obtained.

SUMMARY OF THE INVENTION

The present invention has been made to solve the foregoing problem, and an object thereof is to provide a sensitivity correction method of photoelectric conversion elements and an image reading device, in which shading can be eliminated from a read image regardless of the type of photographic film.

In order to achieve the above object, a first aspect of the present invention is a sensitivity correction method used for an image reading device in which an original is irradiated with light from a light source, and one of transmitted light and reflected light from the original is received by a plurality of photoelectric conversion elements so as to read an image recorded on the original, and for eliminating shading regardless of the type of the original, the method comprising the steps of: acquiring shading data by the photoelectric conversion elements receiving light from the original via a correction member having a spectral characteristic which is substantially identical to a spectral characteristic of the original; and when the image is read, eliminating shading by correcting, on the basis of the shading data, an image signal which is acquired by the photoelectric conversion elements receiving one of the transmitted light and reflected light from the original.

In accordance with the first aspect of the invention, shading data is acquired by using a correction member having a spectral characteristic substantially identical to that of the original which is the object of reading. Thus, appropriate correction can be carried out on the results of reading the original, and a high-quality read image from which shading has been sufficiently eliminated can be obtained. The photoelectric conversion elements used for image reading and the photoelectric conversion elements used for shading data acquisition may be the same or different.

In a second aspect of the present invention, the spectral characteristic of the correction member is substantially proportional to the spectral characteristic of the original. (Namely, the substantially identical spectral characteristic in the first aspect is substantially proportional.) Generally, proportionality in spectral characteristics means that the color amount balances are the same. For example, given that the wavelength is λ, if the relationship between spectral characteristics $D_A(\lambda)$ and $D_B(\lambda)$ is such that $$D_A(\lambda)/D_B(\lambda) = \text{constant},$$

then the spectral characteristic $D_A(\lambda)$ and the spectral characteristic $D_B(\lambda)$ are proportional. FIG. 9 illustrates examples of spectral characteristics which are proportional.

In this way, shading data can be acquired by light from a light source being received by photoelectric conversion elements in a state in which the light amount balance is substantially the same as that at the time of reading the original. In other words, the light amount balances at the time of shading data acquisition and at the time of original reading can be made substantially the same.

A third aspect of the present invention is a sensitivity correction method used for an image reading device in which a film is irradiated with light from a light source, and one of transmitted light and reflected light from the film is received by a plurality of photoelectric conversion elements so as to read an image recorded on the film, and for eliminating shading regardless of the type of the film, the method comprising the steps of: acquiring first shading data by the photoelectric conversion elements receiving light from the light source via a first correction member having a spectral characteristic substantially identical to a spectral characteristic of a first type of film, and storing the first shading data; acquiring second shading data by the photoelectric conversion elements receiving light from the light source via a second correction member having a spectral characteristic substantially identical to a spectral characteristic of a second type of film, and storing the second shading data; and in a case in which the film is the first type of film, on the basis of the first shading data, eliminating shading, when the image is read, by correcting an image signal which is acquired by the photoelectric conversion elements receiving the one of the transmitted light and reflected light from the film, and in a case in which the film is the second type of film, on the basis of the second shading data, eliminating shading, when the image is read, by correcting an image signal which is acquired by the photoelectric conversion elements receiving the one of the transmitted light and reflected light from the film.

In accordance with the third aspect of the invention, first shading data and second shading data corresponding to a first type of film and a second type of film are acquired separately.

More specifically, the first shading data is acquired by light from a light source being received by photoelectric conversion elements via a first correction member having a spectral characteristic substantially identical to that of a first type of film. At this time, the photoelectric conversion elements receive light from a light source whose color balance is changed to be substantially identical to that at the time that light is transmitted through or reflected by the first type of film. Thus, shading which is substantially the same as that at the time of reading a film image recorded on the first type of film can be detected.

Further, the second shading data is acquired by light from the light source being received by the photoelectric conversion elements via a second correction member having a spectral characteristic substantially identical to that of a second type of film. At this time, the photoelectric conversion elements receive light from a light source whose color balance is changed to be substantially identical to that at the time that light is transmitted through or reflected by the second type of film. Thus, shading which is substantially the same as that at the time of reading a film image recorded on the second type of film can be detected.

During image reading, an image signal based on the image recorded on the film which is the object of reading is obtained by the photoelectric conversion elements. At this time, in a case in which the film which is the object of reading is the first type of film, on the basis of the first shading data, the acquired image signal is corrected and shading is eliminated. In a case in which the film which is the object of reading is the second type of film, on the basis of the second shading data, the acquired image signal is corrected and shading is eliminated. Shading can thereby be eliminated from the read image regardless of the type of photographic film.

The first and second shading data by be stored in advance before the image reading device is shipped, or, after the image reading device is shipped, may be acquired and stored periodically (e.g., each time the film which is the object of reading is changed, or each time an image is read, or every month, or at the start of operation each day, or the like). Further, the first and second shading data do not have to be stored at the same time. For example, the first shading data may be stored before the image reading device is shipped, and the second shading data may be acquired and stored periodically after shipment. Further, the photoelectric conversion elements which are used in image reading and those which are used in acquiring the first and second shading data may be the same or different.

A fourth aspect of the present invention is a sensitivity correction method used for an image reading device in which a film is irradiated with light from a light source, and one of transmitted light and reflected light from the film is received by a plurality of photoelectric conversion elements so as to read an image recorded on the film, and for eliminating shading regardless of the type of the film, the method comprising the steps of: acquiring first shading data by the photoelectric conversion elements receiving light from the light source via a first correction member having a spectral characteristic substantially identical to a spectral characteristic of a first type of film, and storing the first shading data; acquiring second shading data by the photoelectric conversion elements receiving light from the light source via a second correction member having a spectral characteristic substantially identical to a spectral characteristic of a second type of film; determining correction data on the basis of the first shading data and the second shading data, and storing the correction data; and when an image is read, selecting, on the basis of a type of the film from which the shading data has been acquired, at least one of the first shading data and the correction data, and on the basis of the selected data, eliminating shading by correcting an image signal which is acquired by the photoelectric conversion elements receiving the one of the transmitted light and reflected light from the film.

In accordance with the fourth aspect, in the same way as in the third aspect, first shading data and second shading data are acquired. Correction data is determined on the basis of the acquired first shading data and second shading data. The first shading data and the correction data are stored in advance.

At the time of image reading, the image signal based on the image recorded on the film which is the object of reading is acquired by the photoelectric conversion elements. Further, on the basis of the type of film whose shading data has been acquired, at least one of first shading data and correction data are selected. On the basis of the selected data, the image signal acquired by the photoelectric conversion elements is corrected, and shading is eliminated from the image signal.

For example, in a case in which the first shading data is shading data for a positive and the second shading data is shading data for a negative, the shading data for the positive and the correction data are stored in advance. Thus, as in the fifth aspect of the present invention, the shading data for the positive and the correction data may be stored, and when the film is a positive film, the image signal may be corrected on the basis of the shading data for the positive when the image is read, and when the film is a negative film, the image signal may be corrected on the basis of the shading data for the positive and the correction data when the image is read.

Further, in a case in which the first shading data is shading data for a negative and the second shading data is shading data for a positive, the shading data for the negative and the correction data are stored in advance. Thus, as in the sixth aspect of the present invention, when the film is a positive film, the image signal may be corrected on the basis of the shading data for the negative and the correction data when the image is read, and when the film is a negative film, the image signal may be corrected on the basis of the shading data for the negative when the image is read.

In this way, by correcting the image signal on the basis of the type of film which is the object of reading, shading can be eliminated from the read image regardless of the type of photographic film.

The correction data may be a correction coefficient determined by calculating the ratio of the first shading data and the second shading data. Or, as in the seventh aspect, the correction data may be a value (correction amount) determined by calculating a difference of the first shading data and the second shading data. By using such correction data, the amount of information which must be stored can be reduced as compared to a case in which the information of both the first shading data and the second shading data are stored.

The correction data and the first shading data (or the second shading data) may be stored in advance before the image reading device is shipped, or, after the image reading device is shipped, may be acquired and stored periodically. Further, the correction data and the first shading data (or the second shading data) do not have to be stored at the same time. For example, the correction data may be stored before the image reading device is shipped, and the first shading data (or the second shading data) may be acquired and stored periodically after shipment. Further, the photoelectric conversion elements which are used in image reading and those which are used in acquiring the first and second shading data may be the same or different.

An eighth aspect of the present invention is an image reading device comprising: a light source which irradiates a film; photoelectric conversion elements which receive light irradiated from the light source and convert the light into an image signal corresponding to an amount of received light; a first shading data acquisition section for acquiring first shading data by the photoelectric conversion elements receiving the light from the light source via a first correction member having a spectral characteristic substantially identical to a first type of film; a second shading data acquisition section for acquiring second shading data by the photoelectric conversion elements receiving the light from the light source via a second correction member having a spectral characteristic substantially identical to a second type of film; a first storing section for storing the first shading data acquired by the first shading data acquisition section; a second storing section for storing the second shading data acquired by the second shading data acquisition section; and a shading eliminating section for, when the image is read, eliminating shading by, when the film is the first type of film, correcting, on the basis of the first shading data stored in the first storing section, an image signal acquired by the photoelectric conversion elements receiving one of transmitted light and reflected light from the film, and when the film is the second type of film, correcting the image signal on the basis of the second shading data stored in the second storing section.

In accordance with the eight aspect, in the same way as the invention of the third aspect, the first shading data and the second shading data corresponding to the first and second types of films are acquired separately by the first shading data acquisition section and the second shading data acquisition section, respectively, and are stored in advance in the first storing section and the second storing section.

At the time of image reading, an image signal based on the image recorded on the film which is the object of reading is obtained by the photoelectric conversion elements. Further, the acquired image signal is corrected and shading is eliminated by the shading eliminating section on the basis of the first shading data when the film which is the object of reading is the first type of film, and on the basis of the second shading data when the film which is the object of reading is the second type of film. In this way, shading can be eliminated from the read image regardless of the type of photographic film.

The first and second correction members are necessary in order to obtain the first shading data and the second shading data, respectively. However, the first and second correction members do not necessarily have to be included an actually shipped image reading device. For example, before the image reading device is shipped, the first and second correction members may be set in the image reading device and the first and second shading data may be acquired and stored. Then, the first and second correction members may be removed from the device and the device may be shipped. Further, it is also possible to set the first and second correction members in the image forming device only at the time the first shading data or the second shading data is acquired.

It is known that the spectral characteristic of a negative film differs in accordance with the type of negative film, such as the manufacturer or the sensitivity or the like. In a case in which the first or the second shading data is the shading data for a negative, as in the ninth aspect of the present invention, one of the first shading data acquisition section and the second shading data acquisition section may be provided with a plurality of correction members for respective types of negative films, and the shading eliminating section may include a determining section for determining the type of negative film in a case in which the film is a negative film, and a selection section for selecting, from one of the first storing section and the second storing section, shading data for a negative corresponding to the type of the negative film determined by the determining section. In this way, a read image of even higher image quality can be obtained when an image recorded on a negative film is read.

A tenth aspect of the present invention is an image reading device comprising: a light source which irradiates a film; photoelectric conversion elements which receive light irradiated from the light source and convert the light into an image signal corresponding to an amount of received light; a first shading data acquisition section for acquiring first shading data by the photoelectric conversion elements receiving the light from the light source via a first correction member having a spectral characteristic substantially identical to a first type of film; a second shading data acquisition section for acquiring second shading data by the photoelectric conversion elements receiving the light from the light source via a second correction member having a spectral characteristic substantially identical to a second type of film; a calculating section for determining correction data on the basis of the first shading data acquired by the first shading data acquiring section and the second shading data acquired by the second shading data acquiring section; a first storing section for storing the first shading data acquired by the first shading data acquiring section; a second storing section for storing the correction data determined by the calculating section; and a shading eliminating section for, at the time of image reading, on the basis of the type of film whose shading data has been acquired, selecting at least one of the shading data stored in the first storing section and the correction data stored in the second storing section, and on the basis of the selected data, eliminating shading by correcting an image signal acquired by the photoelectric conversion elements receiving one of transmitted light and reflected light from the film.

In the tenth aspect of the present invention, in the same way as in the eighth aspect, the first and second shading data are acquired. Further, the correction data is determined by the calculating section on the basis of the acquired first shading data and second shading data. The first shading data is stored in the first storing section and the correction data is stored in the second storing section.

When an image is read, an image signal based on the image which is recorded on the film which is the object of reading is acquired by the photoelectric conversion elements. Further, on the basis of the type of the film for which shading data has been acquired, one of the first shading data and the correction data are selected, and based on this selected data, the shading eliminating section corrects the image signal acquired by the photoelectric conversion elements and eliminates the shading from the image signal.

For example, as in the eleventh aspect of the present invention, in a case in which the film is the first type of film, the shading eliminating section corrects the image signal on the basis of the first shading data stored in the first storing section, and in a case in which the film is the second type of film, the shading eliminating section corrects the image signal on the basis of the first shading data stored in the first storing section and the correction data stored in the second storing section. Shading can be eliminated from the image signal regardless of the type of the photographic film.

More specifically, in a case in which the first shading data is shading data for a positive and the second shading data is shading data for a negative, the shading eliminating section may correct the image signal on the basis of the shading data for the positive when the film is a positive film, and the shading eliminating section may correct the image signal on the basis of the shading data for the positive and the correction data when the film is a negative film.

It is known that the spectral characteristic of a negative film differs in accordance with the type of the negative film such as the manufacturer and sensitivity and the like. When an image recorded on a negative film is read, in order to obtain a read image of even higher image quality, as in the thirteenth aspect of the present invention, the second shading data acquiring section may include a plurality of correction members for respective types of negative films, and the shading eliminating section may include a determining section for determining the type of negative film in a case in which the film is a negative film, and a selecting section for selecting, from the first storing section, correction data corresponding to the type of negative film determined by the determining section.

Further, when the first shading data is shading data for a negative and the second shading data is shading data for a positive, as in the fourteenth aspect of the present invention, in a case in which the first shading data is shading data for a negative and the second shading data is shading data for a positive, the shading eliminating section may correct the image signal on the basis of the shading data for the negative and the correction data when the film is a positive film, and the shading eliminating section may correct the image signal on the basis of the shading data for the negative when the film is a negative film.

In the fifteenth aspect of the present invention, if the calculating section determines the correction data by calculating a difference between the first shading data and the second shading data, because the amount of information of the correction data is smaller than that of the second shading data, the storage capacity required for the storing section is smaller than in a case in which the information of both the first and the second shading data are stored.

In the same way as in the eighth aspect of the present invention, the first and second correction members do not have to actually be included in the image reading device which is shipped.

BRIEF DESCRIPTION OF THE DRAWINGS

FIG. 1 is a schematic structural view of a thermal development transfer apparatus of an embodiment of the present invention.

FIG. 3 is a block diagram showing a detailed structure of an image processor.

FIG. 5 is a flowchart showing film original reading processing.

FIGS. 7A–7D are views for explaining the features of the present invention, in which FIG. 7A is a view showing an example of spectral transmission characteristics of a positive film and a negative film, FIG. 7B is a view showing an example of an amount of transmitted light from a positive film and an amount of transmitted light from a negative film at the time of irradiation of the same light, FIG. 7C is a view showing an example of wavelength characteristics of CCD sensitivity, and FIG. 7D is a view showing CCD output when the light of FIG. 7B is detected by a CCD having the wavelength characteristics of FIG. 7C.

FIG. 9 is a graph for explaining proportional relationships of spectral characteristics.

DESCRIPTION OF THE PREFERRED EMBODIMENTS

Figure 2:
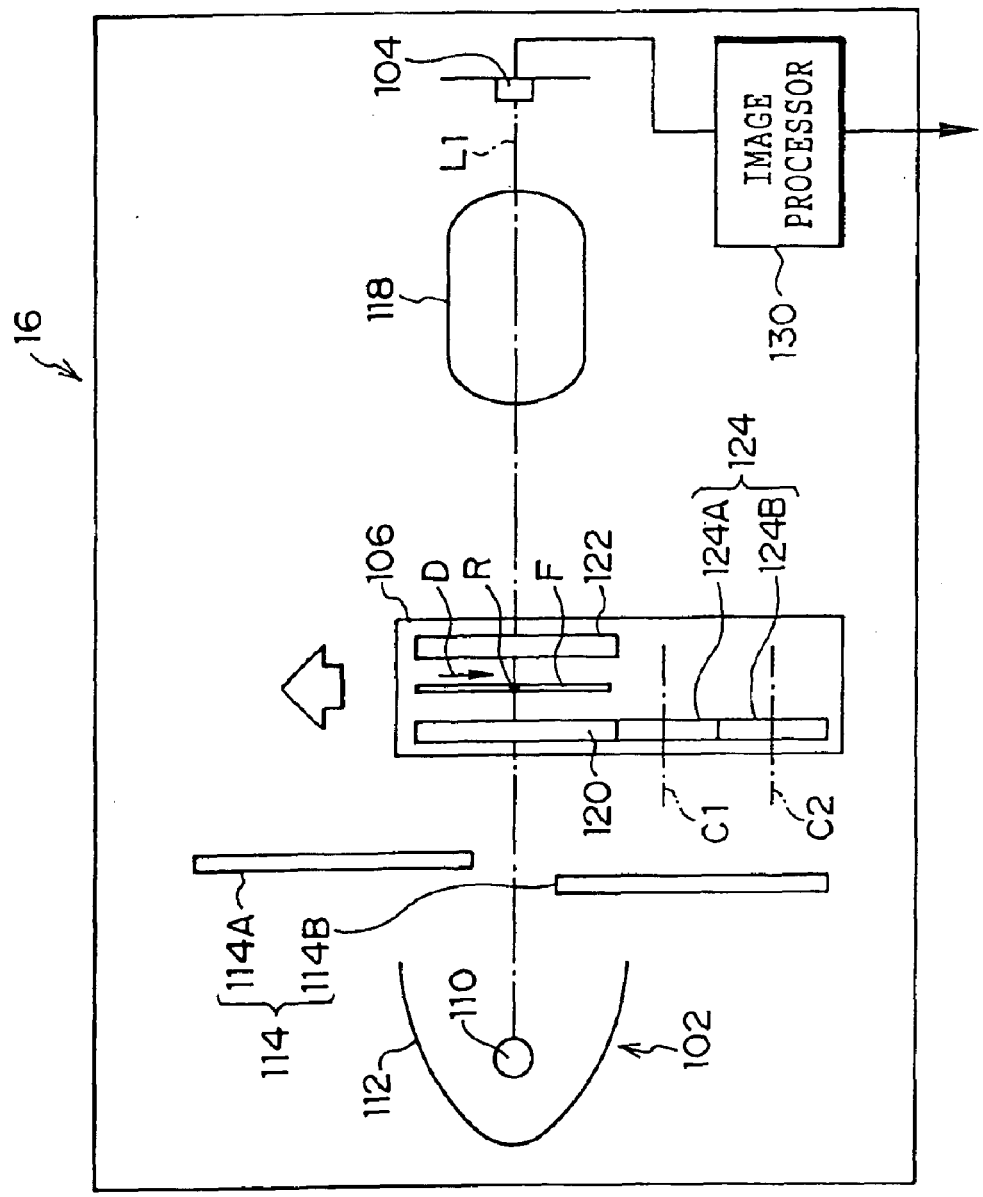
FIG. 2 is a detailed structural view of a film original reading section.

Embodiments of the present invention will next be described in detail with reference to the drawings.

FIG. 1 shows a schematic structure of a thermal development transfer apparatus provided with a film original reading section to which the present invention is applied.

As shown in FIG. 1, a thermal development transfer apparatus 10 includes, at its lower portion, an image forming section 12, and at its upper portion, a normal original reading section 14 for reading an image recorded on an original such as ordinary paper, and a film original reading section 16 for reading an image recorded on a photographic film.

The image forming section 12 includes an image receiving material loading section 20, a photosensitive material loading section 22, a light scanning section 24, an exposure data preparing section 26, a water applying section 28, a thermal developing section 30, and a photosensitive material winding section 32.

An image receiving material 36 wound around a winding shaft 34 is loaded in the image receiving material loading section 20, and is conveyed in the direction toward the thermal developing section 30 by conveying rollers (not shown).

The photosensitive material loading section 22 is disposed below the image receiving material loading section 20. The photosensitive material loading section 22 is designed such that a photosensitive material 40 wound around a winding shaft 38 is loaded therein. The photosensitive material 40 loaded in the photosensitive material loading section 22 is conveyed in a predetermined direction by driving of conveying rollers (not shown).

At the downstream side of the photosensitive material 40 in the conveying direction, the light scanning section 24 is disposed. A laser (not shown) is disposed in the light scanning section 24, and irradiates a light beam onto the photosensitive material 40 while scanning the light beam. The laser is connected with an output terminal of the exposure data preparing section 26 for converting image data into exposure data by carrying out necessary correction on the image data, and the exposure data generated in the exposure data preparing section 26 is inputted to the laser. That is, in the light scanning section 24, driving of the laser is instructed in accordance with the exposure data generated on the basis of the image data, and the photosensitive material 40 is scanned by the light beam and is exposed. An image is thereby written on the photosensitive material 40.

The exposure data preparing section 26 is connected with output terminals of the normal original reading section 14 and the film original reading section 16, so that image data obtained by reading in the normal original reading section 14 and the film original reading section 16 can be inputted to the exposure data preparing section 26. Moreover, the exposure data preparing section 26 is structured so that image data from the outside of the thermal development transfer apparatus 10, for example, image data obtained by photographing with a digital camera or the like, image data obtained by reading with a scanner, image data generated by a computer and recorded on an FD, MO or CD, image data transferred from another computer through a network, communication image data received through a modem, and the like (hereinafter, these are generically referred to as file image data) can also be inputted thereto.

At the downstream side of the photosensitive material 40 in the conveying direction, the water applying section 28 is disposed. The water applying section 28 is supplied with water by a pump from a water tank (not shown) provided in the thermal development transfer apparatus 10. The photosensitive material 40 on which an image has been written by the light scanning section 24 is coated with water by the water applying section 28, is conveyed toward the thermal developing section 30, is superposed with the image receiving material 36, and is guided to the thermal developing section 30. In this way, by applying water to the photosensitive material 40 and then superposing it with the image receiving material 36, the superposed materials 34, 40 can be made to contact one another even more closely.

The thermal developing section 30 includes a heater, and is heated by this heater. In this way, the photosensitive material 40 and the image receiving material 36 conveyed in the thermal developing section 30 are heated for a predetermined time (that is, thermal development processing is carried out), and an image is formed on the image receiving material 36.

The photosensitive material 40 and the image receiving material 36 which were subjected to the thermal development processing and discharged from the thermal developing section 30 are separated from each other by a separating member (not shown), and the photosensitive material 40 is taken up onto a winding shaft 42 provided in the photosensitive material winding section 32 and is disposed of as a waste material. On the other hand, the image receiving material 36 on which the image was formed is discharged to a discharge tray 44 provided at a side (the left side in FIG. 1) of the thermal development transfer apparatus.

An original placement stand 50 made of a transparent glass plate is provided at an upper portion of the normal original reading section 14, and an original such as normal paper or the like on which an image is recorded is placed on the original placement stand 50. Further, an original cover 52 for holding an original to the original placement stand 50 is provided at an upper portion of the original placement stand 50 and can be opened and closed.

A light source 54 for illuminating an original placed on the original placement stand 50, a reflecting plate 56 for collecting the illumination light emitted from the light source 54 onto the original, and a reflecting plate 58 for reflecting the reflected light from the original are provided within the normal original reading section 14. The reflecting plate 56 and the reflecting plate 58 are attached to a carriage (not shown), and this carriage is moved parallel to the original placement stand 50.

The light reflected by the reflecting plate 58 is guided through a plurality of optical members to a lens unit 60 formed by a focusing optical system. The reflected light from the original is focused onto a linear CCD 62 by the lens unit 60. The lens unit 60 is movable along an optical axis of incident light, and focusing onto the linear CCD can be carried out at a desired magnification. In this way, the image recorded on the original placed on the original placement stand 50 can be read. Image data is generated from the results of reading by the linear CCD 62, and is outputted to the exposure data preparing section 26.

The film original reading section 16 is disposed adjacent to the normal original reading section 14. The film original reading section 16 is detachably attached to the thermal development transfer apparatus 10, and is attached to the thermal development transfer apparatus 10 by the user as needed.

The film original reading section 16 is for reading a film image recorded on a photographic film F, and can read film images of, for example, a photographic film of 135 size, a photographic film of 110 size and a photographic film in which a transparent magnetic layer is formed (photographic film of 240 size, a so-called APS film), and a photographic film of 120 size and 220 size (brownie size). The film original reading section 16 outputs image data obtained by reading the film image, which is the object of reading, to the exposure data preparing section 26 of the image forming section 12, and the read image is formed on the image receiving material 36.

(Detailed Structure of Film Original Reading Device)

FIG. 2 shows a detailed structure of a film original reading device. In the following description, the direction indicated by arrow U in FIG. 2 is considered to be the upward direction of the film original reading apparatus.

As shown in FIG. 2, the film original reading section 16 is covered by a casing 100. A light source portion 102 and a linear CCD 104 are disposed opposite to each other in the inside of the casing 100. A film carrier 106 in which a desired photographic film F is loaded is disposed along an optical axis L1 and between the light source portion 102 and the linear CCD 104. In the film original reading section 16, the photographic film F is irradiated with illumination light from the light source portion 102, and the transmitted light is detected by the linear CCD.

The light source portion 102 includes a lamp 110 which is a halogen lamp, a metal halide lamp, or the like, and a reflector 112. The reflector 112 has a light reflecting surface formed by a concave curved surface, and the light reflecting surface surrounds the lamp 110. A portion of the light emitted from the lamp 110 emerges as direct light in the direction along the optical axis L1, and the other portion is reflected by the reflector 112 and emerges as reflected light in the direction along the optical axis L1.

A light source diaphragm 114 is provided between the light source portion 102 and the film carrier 106. By changing the size of the opening of the light source diaphragm 114, it is possible to adjust the amount of light incident on the photographic film F supported at a predetermined reading position R by the film carrier 106.

The film carrier 106 is detachably attached to the film original reading section 16, and the user removes the film carrier 106 from the film original reading section 16 and sets a desired photographic film F.

Within the film carrier 106 at the upper portion thereof, roller pairs (not shown) which nip and convey the photographic film F are provided at an upstream side position and a downstream side position with respect to the reading position R. The photographic film F is conveyed in the direction of arrow D (the vertical direction in FIG. 2) at a predetermined speed in the upper portion in the film carrier 106 by these roller pairs.

In a surface of the film carrier 106 on which light is incident (hereinafter referred to as a "front surface") and a surface (hereinafter referred to as a "rear surface") opposite to the front surface, slit-like openings (not shown) which are long in a transverse direction of the photographic film F are respectively provided at positions corresponding to the reading position R. Thus, light exiting from the light source diaphragm 114 is irradiated onto the photographic film F through the opening provided in the front surface of the film carrier 106, and the light transmitted through the photographic film F is formed into a slit shape through the opening provided in the rear surface of the film carrier 106, and exits from the film carrier 104.

Further, in the upper portion in the film carrier 106, a diffusion plate 120 is provided at an upstream side in a travelling direction of light with respect to the photographic film F, and a glass plate 122 is provided at a downstream side. The diffusion plate 120 and the glass plate 122 are formed to have almost the same size. The diffusion plate 120 and the glass plate 122 prevent dust from entering through the slit-like openings and adhering to the photographic film F.

Due to the diffusion plate 120, light formed into a slit shape is diffused and is irradiated onto the photographic film F. In this way, an amount of light incident on the photographic film F per unit area of the photographic film F is made uniform, and effects of scratches or dust existing on the photographic film F on the read image are not conspicuous.

A correction plate 124 is attached to a lower end portion of the diffusion plate 120. This correction plate 124 is formed such that a correction plate 124A and a correction plate 124B are joined to each other at the center portion of the film original reading apparatus 16 in the vertical direction. The correction plate 124A has a substantially uniform (flat) spectral characteristic (spectral transmission characteristic). Namely, the correction plate 124A has a spectral characteristic which is substantially identical to that of a positive film (substantially proportional to the spectral characteristic of a film). The correction plate 124A can transmit light without changing the light amount balance of the incident light. In the present embodiment, a diffusion plate which is similar to the diffusion plate 120 is used as the correction plate 124A, but a glass plate may be used.

The correction plate 124B has a spectral characteristic (spectral transmission characteristic) which is substantially identical to that of the base portion of a negative film (substantially proportional to the spectral characteristic of a negative film). More specifically, the correction plate 124B may be a member which has a density which is substantially identical to that of the base portion or is substantially identical to a ratio of the spectral characteristic of the base portion. Or, the correction plate 124B may be a member which has a characteristic obtained by multiplying the spectral characteristic of the base portion of the negative film and the (spectral characteristic of) the irradiating light source used to photograph the negative film or an irradiating light source having a spectral characteristic substantially identical to that of the irradiating light source used to photograph the negative film. Alternatively, the correction plate 124B may be a negative film on which is photographed a subject having a substantially uniform brightness (blue sky, a wall, or the like), or a member having a spectral characteristic which is substantially identical to such a negative film.

Specifically, a glass plate of a color substantially the same that of the base portion of a negative film may be used for the correction plate 124B. Or, the correction plate 124B may be a negative film which has not been photographed, or a negative film which has been irradiated uniformly with white light, or a negative film which has been used to photograph a subject of a uniform brightness and which has been developed. Further, a glass plate of substantially the same color as the base portion of the negative film may be adhered to a diffusion plate, and this structure may be used as the correction plate 124B.

In the front surface and the rear surface of the film carrier 106, slit-like openings (not shown) which are long in the width direction of the photographic film F are provided at positions corresponding to the vertical direction centers C1 and C2 of the respective correction plates 124A and 124B. Although the film carrier 106 is normally (at the time of reading a film image) set at a position where the reading position R is coincident with the optical axis L1, it can be moved in the vertical direction of the film original reading device 16 so that the vertical direction center C1 of the correction plate 124A or the vertical direction center C2 of the correction plate 124B is coincident with the optical axis L1 at the time of acquiring shading data.

In the case where the film carrier 104 is moved so that the center C1 of the correction plate 124A is coincident with the optical axis L1, the linear CCD 104 detects light transmitted through the correction plate 124A. From these results of detection, an image processor 130 described later acquires shading data (hereinafter referred to as "shading data for a positive") which expresses the shading due to the light amount distribution of the light source and the difference in sensitivities of the linear CCD 104 at the time of reading a positive film.

In the case where the film carrier 104 is moved so that the center C2 of the correction plate 124B is coincident with the optical axis L1, the linear CCD 104 detects the light transmitted through the correction plate 124B. From these results of detection, the image processor 130 described later acquires shading data (hereinafter referred to as "shading data for a negative") at the time of reading a negative film.

A lens unit 118 serving as an focusing optical system is disposed at a downstream side of the film carrier 106 in the traveling direction of light. Light transmitted through the photographic film F and exiting from the film carrier 106 passes through the lens unit 118, and is focusing on the linear CCD 104. The lens unit 118 can move along the optical axis L1, and focusing onto the linear CCD can be carried out at a desired magnification (the reading resolution can be changed).

The linear CCD 104 is provided with three lines of sensing portions. The respective sensing portions formed as light receiving portions include a large number of photo-electric conversion elements and shutter mechanisms formed by a large number of CCD cells, photodiodes, and the like arranged in one row along a main scan direction, and R, G and B color resolution filters are attached to the light incident sides of the sensing portions (a so-called three-line color CCD). Transfer portions each formed from a large number of CCD cells are provided in vicinities of the respective sensing portions correspondingly to the respective sensing portions.

The linear CCD 104 transfers, to the image processor 130, electric charges stored in the CCD cells as a line signal corresponding to the image density of the photographic film F along the main scan line, for every period corresponding to the conveying speed of the photographic film F.

As shown in FIG. 3, the image processor 130 includes an A/D converter 132, a shading data generating section 134, a shading data storage section 136, and an image data generating section 138.

A line signal from the linear CCD 104 is inputted to the A/D converter 132 and the inputted line signal is subjected to digital conversion.

On the basis of output data of the A/D converter 132 obtained when the film carrier 106 is set at a position where the vertical direction center C1 of the correction plate 124A is coincident with the optical axis L1, the shading data generating section 134 generates shading data for a positive to eliminate the effects of shading at the time of reading a positive film. Moreover, On the basis of output data of the A/D converter 132 obtained when the film carrier 106 is set at a position where the vertical direction center C2 of the correction plate 124B is coincident with the optical axis L1, the shading data generating section generates shading data for a negative to eliminate the effects of shading at the time of reading a negative film.

The shading data storage section 136 stores the shading data for the positive and the shading data for the negative generated by the shading data generating section 134.

The image data generating section 138 carries out, for each pixel, sensitivity correction on the output data (digital data of each line) of the A/D converter 132 obtained when the film carrier 106 is set at a position where the reading position R is coincident with the optical axis L1. In the case where the photographic film F set in the film carrier 106 is a positive film, this sensitivity correction is carried out by using the shading data for the positive stored in the shading data storage section 136. In the case where the photographic film F set in the film carrier 106 is a negative film, this sensitivity correction is carried out by using the shading data for the negative stored in the shading data storage section 136. The image data generating section 138 stores digital data of each line subjected to the sensitivity correction in a memory and generates image data.

The image processor 130 outputs the image data generated in the image data generating section 138 to the exposure data preparing section 26.

Next, as operation of the present embodiment, a description will be given of processing in which a film image recorded on a photographic film is read by the film original reading section and a read image is formed on the image receiving material by the image forming section.

Figure 4:
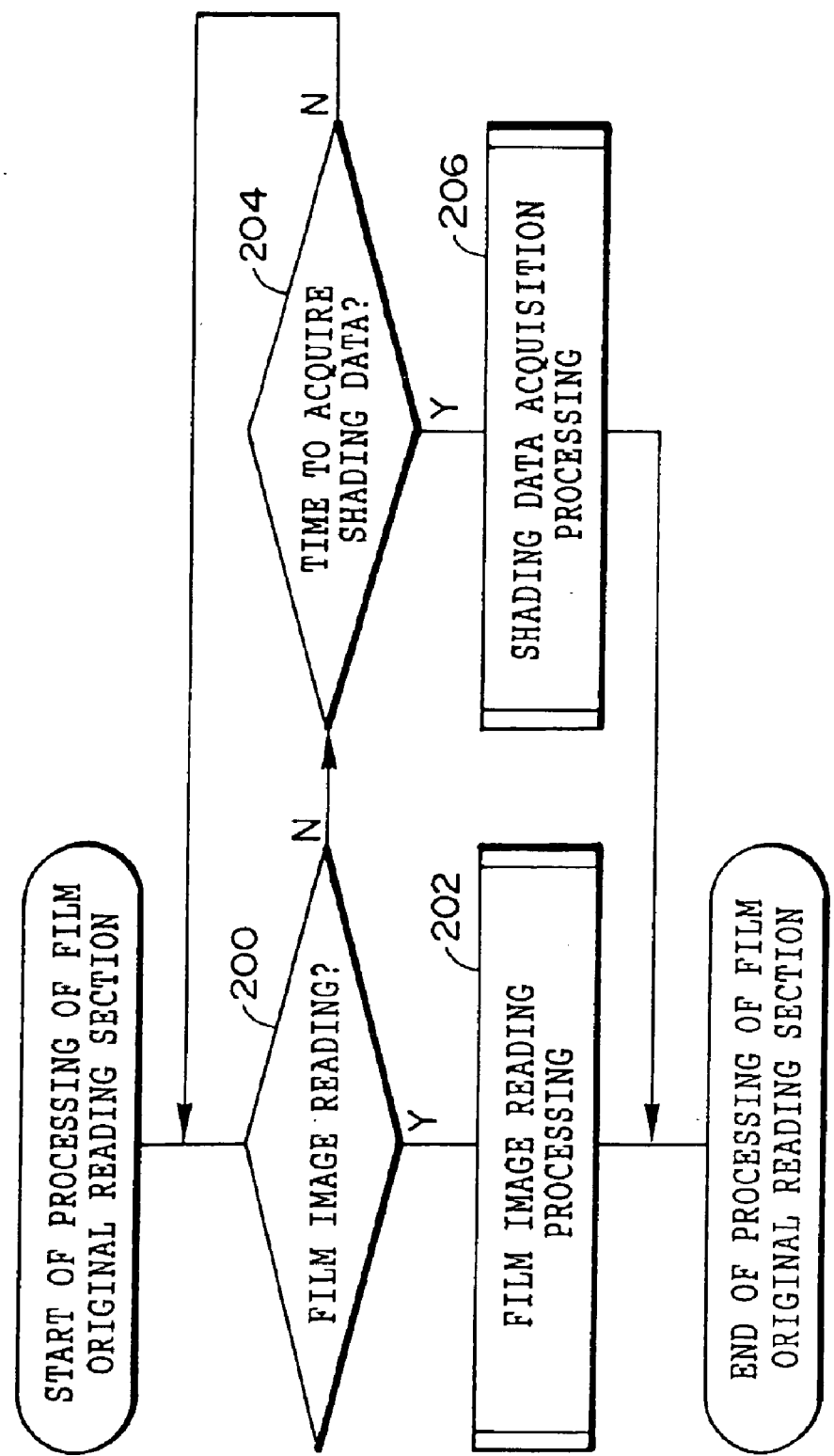
FIG. 4 is a flowchart showing processing carried out at the film original reading section.

FIG. 4 shows processing carried out in the film original reading section 16. As shown in FIG. 4, in the film original reading section 16, when reading of a film image is instructed (step 200), film image reading processing is carried out (step 202). When the time for acquiring shading data is reached (step 204), shading data acquisition processing (step 206) is carried out.

As shown in FIG. 5, in the film image reading processing, first, it is judged whether the photographic film F which is the object of reading is a positive film or a negative film (step 300). The method of discriminating between positive films and negative films is not particularly limited in the present invention, and may be carried out user operating an operation panel (not shown) to input the film type (i.e., positive film or negative film), or by providing a sensor for reading the film type in the film carrier 106 and determining the film type on the basis of the output signal from this sensor.

In the case where the photographic film F which is the object of reading is a positive film (an affirmative judgement at step 300), the processing proceeds to step 302, and one line of the film image is read by the linear CCD 104.

Specifically, illuminating light emitted from the light source portion 102 and passing through the opening (the gap between light shielding plates 114A and 114B) of the light source diaphragm 114 is diffused by the diffusion plate 120, and is irradiated onto the photographic film F supported at the reading position R. At this time, the illuminating light exiting from the diffusion plate 120 becomes a bundle of light beams symmetric about the optical axis L1. In this way, light of a light amount corresponding to the image density is transmitted through an image recording region of the photographic film F supported at the reading position R. The illuminating light transmitted through the photographic film F and carrying the film image also becomes a bundle of light beams symmetric about the optical axis L1 and is incident on the lens unit 118, and is detected by the linear CCD 104.

The line signal obtained by the linear CCD 104 on the basis of the image density is transmitted to the image processor 130, is subjected to digital conversion, and then, is transmitted to the image data generating section 138. The image data generating section 138 selects the shading data for the positive from the shading data storage section 136, and carries out sensitivity correction (for example, adding the shading data to the output data, or the like) for each pixel of the output data (image data of one line) of the linear CCD 104 which data has been subjected to the digital conversion (step 304). The data subjected to the sensitivity correction is stored in the memory, and in the case where the next line of the film image is read (a negative judgement at step 306), the processing returns to step 302.

When film image reading is ended (an affirmative judgement at step 306), the processing proceeds to step 308, and data stored in the memory is transmitted as image data to the exposure data preparing section 26 of the image forming section 12.

On the other hand, in the case where the photographic film F which is the object of reading is a negative film, a negative judgement is made at step 300, and the processing proceeds to step 310. At step 310, similarly to step 302, one line of a film image is read by the linear CCD 104.

A line signal obtained by the linear CCD 104 on the basis of the image density is transmitted to the image processor 130, is subjected to digital conversion, and then, is transmitted to the image data generating section 138. The shading data for the negative is selected from the shading data storage section 136, and sensitivity correction is carried out (step 312) in the same way as in the step 304. The data subjected to the sensitivity correction is stored in the memory, and in the case where the next line of the film image is read (a negative judgement at step 314), the processing returns to step 310.

When film image reading is ended (an affirmative judgement at step 314), the processing proceeds to step 308, and the data stored in the memory is transmitted as image data to the exposure data preparing section 26 of the image forming section 12.

When the exposure data preparing section 26 of the image forming section 12 receives the image data through the processing of step 308, the exposure data preparing section 26 carries out various corrections and then converts the image data into exposure data. The exposure data is transmitted to the light scanning section 24. In the image forming section 12, the photosensitive material 40 loaded in the photosensitive material loading section 22 is conveyed to the light scanning position of the light scanning section 24 by driving of conveying rollers (not shown). The light scanning section 24 scans and exposes the photosensitive material 40 on the basis of the exposure data. The exposed photosensitive material 40 is coated with water by the water applying section 28, and then, is superposed with the image receiving paper 36 and is fed to the thermal developing section 30. The photosensitive material 40 and the image receiving paper 36 are heated for a predetermined time by the thermal developing section 30, and an image is formed on the image receiving paper 36. Thereafter, the photosensitive material 40 is taken up onto the photosensitive material winding section 32, and is disposed of as waste material. The image receiving paper 36 on which the image is formed is discharged to the discharge tray 44.

The shading data acquisition processing to acquire the shading data for the positive and the shading data for the negative used for the sensitivity correction may be carried out in advance before shipment of the image reading device, may be periodically carried out at the time of use of the image reading device, for example, each day when operation starts or every month, or may be carried out each time a new photographic film F is set, or may be carried out every time immediately before an image is read. Further, the shading data acquisition processing may be carried out at an arbitrary timing, for example, when the user operates an operation panel (not shown) to instruct acquisition of the shading data.

Figure 6:
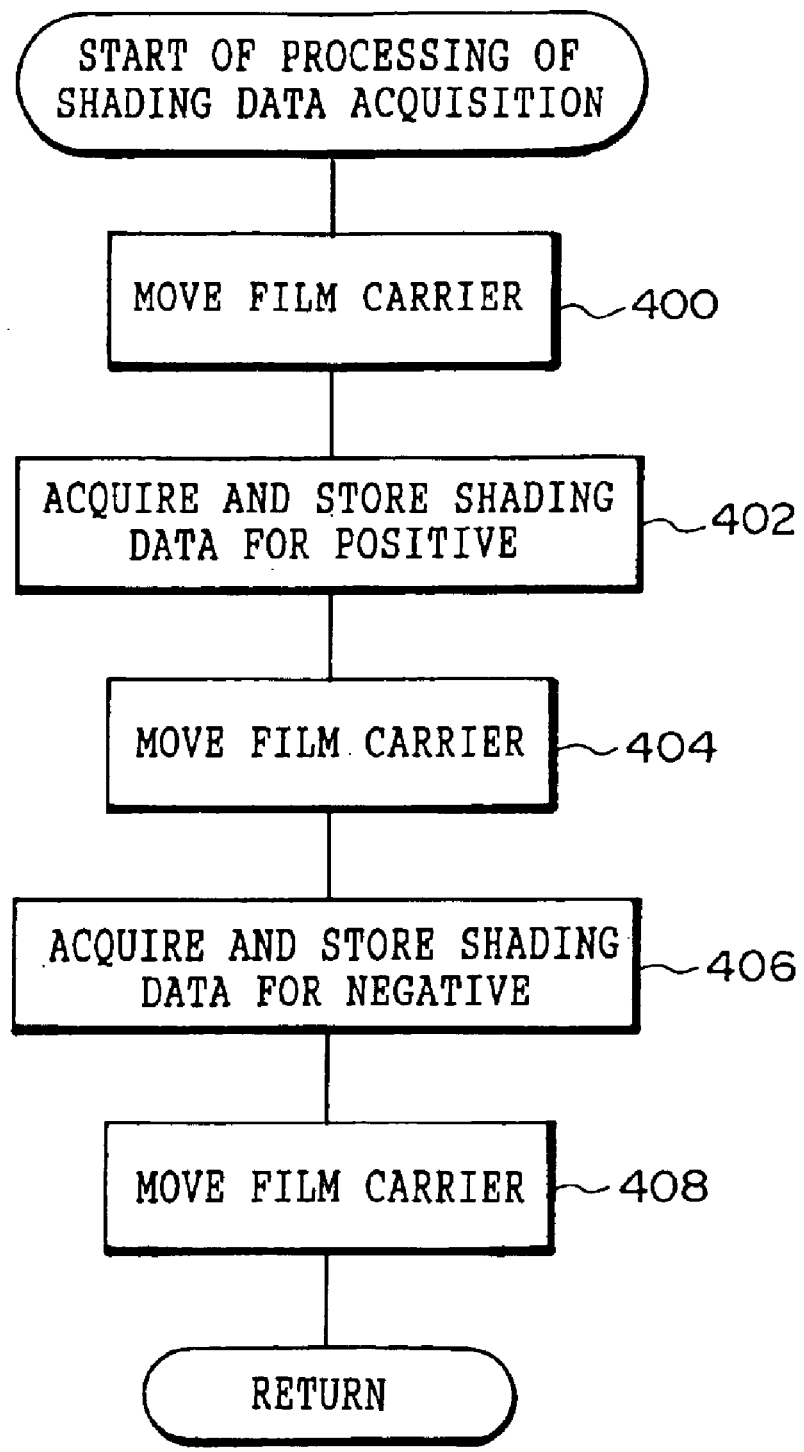
FIG. 6 is a flowchart showing shading data acquisition processing.
Figure 8A:
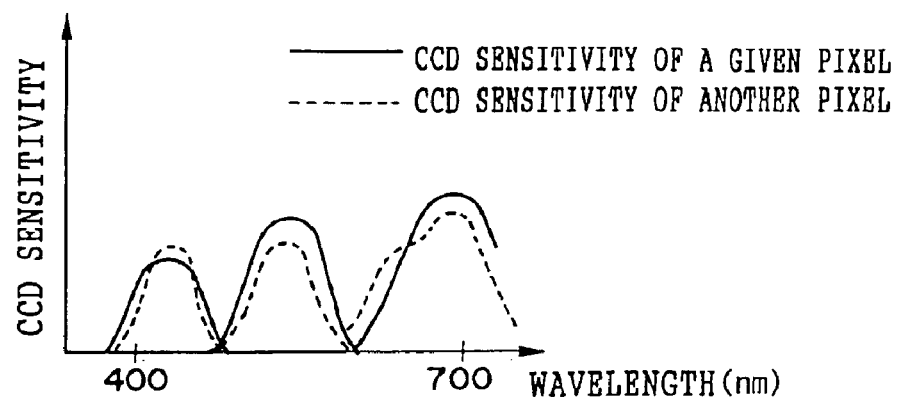
FIG. 8A is a view showing an example of wavelength characteristics of CCD sensitivity for explaining that the wavelength characteristics of a CCD are different for each pixel.
Figure 8B:
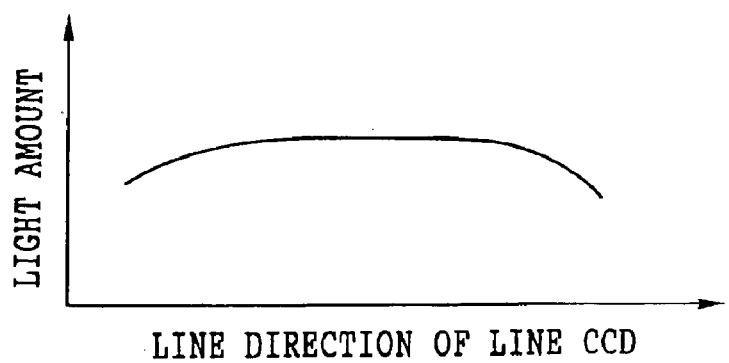
FIG. 8B is a view for explaining that an amount of irradiation light from a light source is irregular.
Figure 8C:
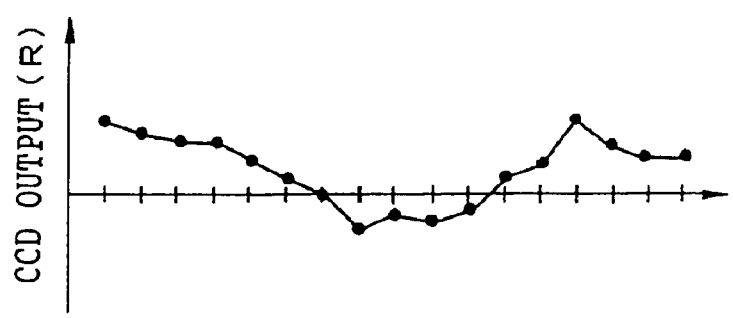
FIG. 8C is a view for explaining shading and showing an example of CCD output of one red line by a linear CCD.

In the shading data acquisition processing, as shown in FIG. 6, first, the film carrier 106 is moved to a position where the vertical direction center C1 of the correction plate 124A is coincident with the optical axis L1 and is set thereat (step 400). In this way, the illuminating light emitted from the light source portion 102 and passing through the opening (the gap between the light shielding plates 114A and 114B) of the light source diaphragm 114 is irradiated onto the correction plate 124A. The correction plate 124A allows incident light to be transmitted therethrough without changing a light amount balance, and this transmitted light becomes a bundle of light beams symmetric about the optical axis L1, is incident on the lens unit 118, and is detected by the linear CCD 104.

The transmissivity of the positive film is substantially constant regardless of the wavelength of the light (wavelengths in the visible region). Light passes through the positive film without the light amount balance (spectral characteristic of the irradiated light) changing. Thus, the effects of shading at the time of reading the positive film can be grasped from the results of detection of the line CCD 104 at this time.

Next, the processing proceeds to step 402, the output signal of the linear CCD 104 is transmitted to the image processor 130, and after the signal is converted into a digital signal by the A/D converter 132, the digital signal is inputted to the shading data generating section 134. The shading data generating section 134 calculates a correction amount for each pixel so that a signal value of each pixel becomes constant for each color (RGB) and so that signal values of the respective colors (RGB) at that time are also equal to each other, and generates the shading data for the positive to eliminate the shading at the time of reading the positive film. The shading data for the positive is stored in the shading data storage section 136.

The output signal from the line CCD 104 may be amplified if necessary. Further, the shading data for the positive is generated by data which has been acquired by one time by the linear sensor 104. However, the shading data for the positive may be generated by using data acquired over plural times and averaged. At this time, by moving the correction plate 124A by extremely small amounts, data can be acquired plural times by the line CCD 104.

Next, the film carrier 106 is moved to the position where the vertical direction center C2 of the correction plate 124B is coincident with the optical axis L1 and is set thereat (step 404). In this way, illuminating light emitted from the light source portion 102 and passing through the opening (the gap between the light shielding plates 114A and 114B) of the light source diaphragm 114 is irradiated onto the correction plate 124B having a spectral transmission characteristic substantially the same as that of a base portion of a developed negative film. The transmitted light from the correction plate 124B becomes a bundle of light beams symmetrical around the optical axis L1 and is incident on the lens unit 118, and is detected by the line CCD 104.

Substantially identically to the base portion of a negative film, the correction plate 124B allows light to be transmitted therethrough while varying the light amount balance of the incident irradiated light. Thus, the effects of shading at the time of reading a negative film can be grasped from the results of detection of the line CCD 104 at this time.

Next, the processing proceeds to step 406, and the output signal of the linear CCD 104 is transmitted to the image processor 130. The signal is converted into a digital signal by the A/D converter 132, and thereafter, the digital signal is inputted to the shading data generating section 134. The shading data generating section 134 carries out the same processing that is carried out at the time of generating the shading data for the positive, and generates the shading data for the negative. The shading data for the negative are stored in the shading data storage section 136.

The output signal from the line CCD 104 may be amplified if necessary. Further, the shading data for the negative is generated by data which has been acquired by one time by the linear sensor 104. However, the shading data for the negative may be generated by using data acquired over plural times and averaged. At this time, by moving the correction plate 124B by extremely small amounts, data can be acquired plural times by the line CCD 104.

Thereafter, the film carrier 106 is moved to the normal position (the position where the reading position R is coincident with the optical axis L1) (step 408).

Next, a specific description will be given of an example which is a case where, as shown in FIG. 7A, the spectral reflection characteristic of a base portion of a negative film is such that, as the wavelength approaches that of red light, the transmissivity increases.

When light with a light amount balance as shown by (1) in FIG. 7B is irradiated onto a photographic film, since the spectral transmission characteristic is uniform (flat) in the case of a positive film, the light is transmitted with the light amount balance of the incident light remaining unchanged. That is, the light with the light amount balance shown by (1) in FIG. 7B is incident on the linear CCD 104 as the transmitted light. On the other hand, in the case of a negative film, the light amount balance of the transmitted light is such that the light amount in the red wavelength region becomes large as shown by (2) in FIG. 7B.

When a CCD in the linear CCD 104 has RGB sensitivity as shown in FIG. 7C, in the case of a positive film, a CCD output as indicated by the dotted line in FIG. 7D is obtained (blue output: BP, green output: GP, red output: RP). On the other hand, in the case of a negative film, a CCD output as indicated by the solid line in FIG. 7D is obtained (blue output: BN, green output: GN, red output: RN).

As can be understood from FIG. 7D, the output of the CCD is different between the case of reading a positive film and the case of reading a negative film. Thus, shading when a film image is read is different between a positive film and the negative film.

Conventionally, shading data are generated from the CCD output in a blank state (the light amount balance of incident light is not changed), that is, in a state substantially the same as that at the time of reading a positive film. Also when a film image of a negative film is read, sensitivity correction is carried out by using the shading data. Thus, shading cannot be eliminated at the time of reading the negative film.

In contrast, in the present embodiment, as described above, separately from the shading data (shading data for the positive), the shading data for the negative is generated by detecting at the linear CCD 104 the transmitted light from the correction plate 124B having a spectral transmission characteristic substantially the same as that of the base portion of the negative film, and sensitivity correction is carried out by using the shading data for the negative at the time of reading the film image of the negative film. In this way, shading can be eliminated from the read image regardless of whether the film is a positive film or a negative film.

As shown in FIG. 7D, in the case where the difference between the red outputs RP and RN is especially large, and the difference between the blue outputs BP and BN and the difference between the green outputs GP and GN are very small (generally, there is the tendency that such a relation is established between the time of reading the positive film and the time of reading the negative film), it is possible to generate only the correction amount of red for the negative, and to use data of blue and green in the shading data for the positive for blue and green data for the negative. In this case, the storage region for storing the correction amounts of the blue and green shading data for the negative can be omitted, which brings about a reduction in costs.

In the present embodiment, a case is described in which both the shading data for the positive and the shading data for the negative are stored, and these data are used in sensitivity correction at the time of film image reading. However, the present invention is not limited to the same. A calculating section may be further provided for determining correction data by calculation using the shading data for the positive and the shading data for the negative. This correction data obtained by the calculating section can be stored and used in sensitivity correction at the time of film image reading.

For example, the correction data may be a correction amount between the positive and the negative which is determined by calculating the difference between the shading data for the positive and the shading data of the negative. This correction data is stored and used for sensitivity correction.

In this case, the shading data for the positive (or the negative) and the correction amount between the positive and the negative may be added or subtracted to generate the shading data for the negative (or the positive) and sensitivity correction may be carried out. Or, after sensitivity correction is carried out by using the shading data for the positive (or the negative), correction may again be carried out by using the correction amount between the positive and the negative. In these ways, the effects of the shading can be eliminated also at the time of reading the negative film (or the positive film).

Further, at the time the image reading device is shipped, as the correction data, a ratio between the shading data for the positive and the shading data for the negative may be calculated so that a correction coefficient can be determined and stored. After shipment, the shading data for the positive (or the negative) may be acquired periodically and multiplied by the correction coefficient so as to carry out sensitivity correction. A specific example of such processes will be described hereinafter.

At the time of shipping the image reading device, the film carrier 106 is set at a position at which the center C1 of the correction plate 124A and the optical axis L1 coincide with one another. Acquisition data acquired by the line CCD 104 over a predetermined number of times (usually 5 to 10 times, although the number of times for acquiring data may be changed) are averaged for each pixel, so as to obtain a positive table Posi_tbl. If data is acquired a single time, the acquisition data is the positive table Posi_tbl as is.

For example, in a case in which data is acquired 5 times by the line CCD 104, if the acquisition data of the respective times is Posi1_tbl, Posi2_tbl, Posi3_tbl, Posi4_tbl, Posi5_tbl, then the positive table Posi_tbl is $$Posi\_tbl=(Posi1\_tbl+Posi2\_tbl+Posi3\_tbl+Posi4\_tbl+Posi5\_tbl)/5$$

Given that the minimum value in the positive table Posi_tbl is Posi(min), normalization is carried out by using the calculation $$Shd(P)\_tbl=Posi\_tbl/Posi(\text{min})$$

so as to generate shading data Shd(P)_tbl for the positive.

Next, the film carrier 106 is set at a position at which the center C2 of the correction plate 124B and the optical axis L1 coincide. For each pixel, acquisition data is acquired a plural number of times (usually 5 to 10 times, but the number of times of acquisition may be changed) by the line CCD 104 and is averaged, so as to acquire the negative table Nega_tbl. If data is acquired a single time, the acquisition data is the negative table Nega_tbl as is.

For example, in a case in which data is acquired 5 times by the line CCD 104, if the acquisition data of the respective times is Nega1_tbl, Nega2_tbl, Nega3_tbl, Nega4_tbl, Nega5_tbl, then the negative table Nega_tbl is $$Nega\_tbl=(Nega1\_tbl+Nega2\_tbl+Nega3\_tbl+Nega4\_tbl+Nega5\_tbl)/5$$

Given that the minimum value in the negative table Nega_tbl is Nega(min), normalization is carried out by using the calculation $$Shd(N)\_tbl=Nega\_tbl/Nega(min)$$

so as to generate shading data Shd(N)_tbl for the negative.

By calculating the ratio of the generated shading data Shd(P)_tbl for the positive and the generated shading data Shd(N)_tbl for the negative, a correction coefficient table Correct_tbl which is $$Correct\_tbl=Shd(N)\_tbl/Shd(P)\_tbl$$

is determined, and is stored.

After the image reading device is shipped, the shading data Shd(P)_tbl for the positive is acquired periodically, and on the basis of the latest shading data Shd(P)_tbl for the positive acquired at the time of positive film reading, sensitivity correction is carried out. At the time of reading the negative film, given that the latest shading data for the positive is Shd(P)_tbl_new, the new shading data Shd(N)_tbl_new for the negative is calculated as follows:

$$Shd(N)\_tbl\_new=Correct\_tbl \times Shd(P)\_tbl\_new$$

Sensitivity correction is carried out on the basis of the shading data Shd(N)_tbl_new for the negative.

By using correction data (the correction amount between the positive and the negative, or the correction coefficient) in this way, the storage capacity required by the shading data storing section can be reduced.

Further, if the correction data is determined and stored at the time of shipping the image reading device and the shading data for the positive (or for the negative) is acquired after shipment periodically (e.g., each time the power is turned on, each time a predetermined amount of time passes, each time a new photographic film is set, each time one image is read, or the like), changes over time in the amount of light of the light source can be addressed. Further, after shipment, by acquiring only the shading data for the positive (or for the negative), shading can be eliminated for both a positive film and a negative film. Thus, after the correction data is acquired, the correction member B (or the correction member A) can be done away with.

Further, in the present embodiment, the type of the negative film (i.e., the manufacturer, the sensitivity, and the like) are not considered. However, a plurality of correction plates 124B may be readied in correspondence with the types of negative films, and shading data of the negative can be obtained for each type of negative film. Further, the correction plates 124B readied for the respective types of negative films may be joined together to form a single member. Control can be effected such that the member is moved to the optical axis position L1 so that shading data for the negative of any of the types of negative films can be acquired.

At the time of reading the negative film, the correction plate 124B which corresponds to the type of the negative film which is the object of reading may be selected, the shading data for the negative may be acquired, and sensitivity correction may be carried out. Alternatively, for each type of negative film, the shading data for the negative (or the correction data) may be stored in advance, the shading data for the negative (or the correction data) corresponding to the type of negative film which is the object of reading may be selected, and sensitivity correction may be carried out.

The determining of the type of negative film which is the object of reading may be carried out by the user inputting the type of negative film by operating an operation panel (not shown), and discerning the type of negative film from the input information. Or, a sensor or the like for determining the type of negative film may be provided at the film carrier 106, and the type of the negative film may be determined on the basis of the output signal from this sensor.

Further, in the present embodiment, the shading data for the positive is acquired by using the correction plate 124A. However, because the spectral characteristic of the positive film is flat, the correction plate 124A may be omitted, and when there is no photographic film F at the reading position R (e.g., before conveying of the photographic film F or before loading of the photographic film F in the film carrier), i.e., in a blank state, the shading data for the positive may be acquired by the line CCD 104 receiving the light from the light source section 102.

Further, in the present embodiment, the shading data for the positive or the shading data for the negative is acquired by moving the film carrier 106. However, the present invention is not limited to the same. By using an unexposed but processed positive film for the correction plate 124A and an unexposed but processed negative film for the correction plate 124B, if the correction plate 124 is formed as a photographic film or in a photographic film like shape, the correction plate 124 may be set at the position for setting the photographic film F at the film carrier 106, and the shading data can be acquired. In this case, there is no need to move the film carrier 106. Further, in this case, the correction plate 124 can be moved by utilizing the function for conveying the photographic film.

Further, in the present embodiment, a description is given of the example of an image reading device (film original reading section) which reads an image line-by-line by using a line CCD 104 in which the photoelectric conversion elements of the respective colors of RGB are arranged in a line. However, the present invention is not limited to the same, and an image reading device which is structured to read images by a plurality of photoelectric conversion elements can be used.

For example, the present invention may be applied to an image reading device which reads images in units of regions by using an area CCD sensor or the like. Further, the present invention is also applicable to image reading devices which read black-and-white images, monochrome images or the like. Further, in the present embodiment, the photoelectric conversion elements used for the reading of the original and those used for the acquiring of the shading data are the same. However, respectively different photoelectric conversion elements may be used.

Moreover, in the present embodiment, an example is described of an image reading device (film original reading section) in which a positive film and a negative film are the original which is the object of reading. However, the type of original is not particularly limited in the present invention. Shading data may be acquired by using a correction member which has a spectral characteristic substantially identical to the original which is the object of reading. By effecting sensitivity correction in order to eliminate the effects of shading from the read image, appropriate sensitivity correction can be carried out even if the spectral characteristics differ in accordance with the type of the original. If the original is a photographic film, in addition to positive films and negative films, DCN films, black-and-white films, sepia films and the like may be used as the object of reading.

In the present embodiment, a transmission type image reading device (film original reading section) is described as an example. However the present invention is not limited to the same, and may be applied to a reflection-type image reading device.

What is claimed is:

1. A sensitivity correction method used for an image reading device in which an original is irradiated with light from a light source, and one of transmitted light and reflected light from the original is received by a plurality of photoelectric conversion elements so as to read an image recorded on the original, and for eliminating shading regardless of the type of the original, the method comprising the steps of:

acquiring shading data by the photoelectric conversion elements receiving light from the original via a correction member having a spectral characteristic which is substantially identical to a spectral characteristic of the original; and when the image is read, eliminating shading by correcting, on the basis of the shading data, an image signal which is acquired by the photoelectric conversion elements receiving one of the transmitted light and reflected light from the original.

2. A sensitivity correction method according to claim 1, wherein the spectral characteristic of the correction member is substantially proportional to the spectral characteristic of the original.

3. A sensitivity correction method used for an image reading device in which a film is irradiated with light from a light source, and one of transmitted light and reflected light from the film is received by a plurality of photoelectric conversion elements so as to read an image recorded on the film, and for eliminating shading regardless of the type of the film, the method comprising the steps of:

acquiring first shading data by the photoelectric conversion elements receiving light from the light source via a first correction member having a spectral characteristic substantially identical to a spectral characteristic of a first type of film, and storing the first shading data;

acquiring second shading data by the photoelectric conversion elements receiving light from the light source via a second correction member having a spectral characteristic substantially identical to a spectral characteristic of a second type of film, and storing the second shading data; and in a case in which the film is the first type of film, on the basis of the first shading data, eliminating shading, when the image is read, by correcting an image signal which is acquired by the photoelectric conversion elements receiving the one of the transmitted light and reflected light from the film, and in a case in which the film is the second type of film, on the basis of the second shading data, eliminating shading, when the image is read, by correcting an image signal which is acquired by the photoelectric conversion elements receiving the one of the transmitted light and reflected light from the film.

4. A sensitivity correction method used for an image reading device in which a film is irradiated with light from a light source, and one of transmitted light and reflected light from the film is received by a plurality of photoelectric conversion elements so as to read an image recorded on the film, and for eliminating shading regardless of the type of the film, the method comprising the steps of:

acquiring first shading data by the photoelectric conversion elements receiving light from the light source via a first correction member having a spectral characteristic substantially identical to a spectral characteristic of a first type of film, and storing the first shading data;

acquiring second shading data by the photoelectric conversion elements receiving light from the light source via a second correction member having a spectral characteristic substantially identical to a spectral characteristic of a second type of film;

determining correction data on the basis of the first shading data and the second shading data, and storing the correction data; and when an image is read, selecting, on the basis of a type of the film from which the shading data has been acquired, at least one of the first shading data and the correction data, and on the basis of the selected data, eliminating shading by correcting an image signal which is acquired by the photoelectric conversion elements receiving the one of the transmitted light and reflected light from the film.

5. A sensitivity correction method according to claim 4, wherein in a case in which the first shading data is shading data for a positive and the second shading data is shading data for a negative, the shading data for the positive and the correction data are stored, and when the film is a positive film, the image signal is corrected on the basis of the shading data for the positive when the image is read, and when the film is a negative film, the image signal is corrected on the basis of the shading data for the positive and the correction data when the image is read.

6. A sensitivity correction method according to claim 4, wherein in a case in which the first shading data is shading data for a negative and the second shading data is shading data for a positive, the shading data for the negative and the correction data are stored, and when the film is a positive film, the image signal is corrected on the basis of the shading data for the negative and the correction data when the image is read, and when the film is a negative film, the image signal is corrected on the basis of the shading data for the negative when the image is read.

7. A sensitivity correction method according to claim 4, wherein the correction data is determined by calculating a difference between the first shading data and the second shading data.

8. An image reading device comprising:

a light source which irradiates a film;

photoelectric conversion elements which receive light irradiated from the light source and convert the light into an image signal corresponding to an amount of received light;

a first shading data acquisition section for acquiring first shading data by the photoelectric conversion elements receiving the light from the light source via a first correction member having a spectral characteristic substantially identical to a first type of film;

a second shading data acquisition section for acquiring second shading data by the photoelectric conversion elements receiving the light from the light source via a second correction member having a spectral characteristic substantially identical to a second type of film;

a first storing section for storing the first shading data acquired by the first shading data acquisition section;

a second storing section for storing the second shading data acquired by the second shading data acquisition section; and a shading eliminating section for, when the image is read, eliminating shading by, when the film is the first type of film, correcting, on the basis of the first shading data stored in the first storing section, an image signal acquired by the photoelectric conversion elements receiving one of transmitted light and reflected light from the film, and when the film is the second type of film, correcting the image signal on the basis of the second shading data stored in the second storing section.

9. An image reading device according to claim 8, wherein in a case in which one of the first shading data and the second shading data is shading data for a negative, one of the first shading data acquisition section and the second shading data acquisition section is provided with a plurality of correction members for respective types of negative films, and the shading eliminating section includes a determining section for determining the type of negative film in a case in which the film is a negative film, and a selection section for selecting, from one of the first storing section and the second storing section, shading data for a negative corresponding to the type of the negative film determined by the determining section.

10. An image reading device comprising:

a light source which irradiates a film;

photoelectric conversion elements which receive light irradiated from the light source and convert the light into an image signal corresponding to an amount of received light;

a first shading data acquisition section for acquiring first shading data by the photoelectric conversion elements receiving the light from the light source via a first correction member having a spectral characteristic substantially identical to a first type of film;

a second shading data acquisition section for acquiring second shading data by the photoelectric conversion elements receiving the light from the light source via a second correction member having a spectral characteristic substantially identical to a second type of film;

calculating section for determining correction data on the basis of the first shading data acquired by the first shading data acquiring section and the second shading data acquired by the second shading data acquiring section;

a first storing section for storing the first shading data acquired by the first shading data acquiring section;

a second storing section for storing the correction data determined by the calculating section; and a shading eliminating section for, at the time of image reading, on the basis of the type of film whose shading data has been acquired, selecting at least one of the shading data stored in the first storing section and the correction data stored in the second storing section, and on the basis of the selected data, eliminating shading by correcting an image signal acquired by the photoelectric conversion elements receiving one of transmitted light and reflected light from the film.

11. An image reading device according to claim 10, wherein in a case in which the film is the first type of film, the shading eliminating section corrects the image signal on the basis of the first shading data stored in the first storing section, and in a case in which the film is the second type of film, the shading eliminating section corrects the image signal on the basis of the first shading data stored in the first storing section and the correction data stored in the second storing section.

12. An image reading device according to claim 11, wherein in a case in which the first shading data is shading data for a negative and the second shading data is shading data for a positive, the shading eliminating section corrects the image signal on the basis of the shading data for the negative and the correction data when the film is a positive film, and the shading eliminating section corrects the image signal on the basis of the shading data for the negative when the film is a negative film.

13. An image reading device according to claim 11, wherein in a case in which the first shading data is shading data for a positive and the second shading data is shading data for a negative, the shading eliminating section corrects the image signal on the basis of the shading data for the positive when the film is a positive film, and the shading eliminating section corrects the image signal on the basis of the shading data for the positive and the correction data when the film is a negative film.

14. An image reading device according to claim 13, wherein the second shading data acquiring section includes a plurality of correction members for respective types of negative films, and the shading eliminating section includes a determining section for determining the type of negative film in a case in which the film is a negative film, and a selecting section for selecting, from the first storing section, correction data corresponding to the type of negative film determined by the determining section.

15. An image reading device according to claim 10, wherein the calculating section determines the correction data by calculating a difference between the first shading data and the second shading data.

* * * * *